United States Patent [19]
Kasso et al.

[11] Patent Number: 5,893,073
[45] Date of Patent: *Apr. 6, 1999

[54] METHOD AND APPARATUS FOR REPRESENTING RECURRING EVENTS

[75] Inventors: Chris S. Kasso, Sunnyvale; Martin Arthur Knutson, Cupertino; Yvonne Yuen-Yee Tso, Milpitas, all of Calif.; Frank R. Dawson, Keller, Tex.

[73] Assignees: Sun Microsystems, Inc., Mountain View, Calif.; International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 395,458

[22] Filed: Feb. 27, 1995

[51] Int. Cl.$^6$ .................................. G06F 7/60; G06G 7/52
[52] U.S. Cl. ............................... 705/8; 705/9; 364/705.07; 364/705.08
[58] Field of Search ....................................... 395/201, 207, 395/208; 364/705.07, 705.08; 368/1, 9, 10, 243, 244, 250, 251, 327; 705/1, 7, 8, 9, 11

[56] References Cited

U.S. PATENT DOCUMENTS 5,260,868  11/1993  Gupta et al. .
5,416,473   5/1995  Dulaney, III et al. .............  340/824.44
5,491,626   2/1996  Williams et al. .

OTHER PUBLICATIONS

Chronos Ptorocol Working Group, Description and Proposed Standard for Appointment Scheduling and Time Management, Paul Linder, Jan. 1991, 15 pages.
Chronous Protocol Working Group, Description and Proposed Standard for Appointment Scheduling and Time Management–Rev. 1.13, Paul Lindner, Feb. 4, 1991, 21 pages.
Chronos@Boombox.Micro.umn.edu Mailing List Postings, Jan. 7, 1991–Mar. 1, 1991, 89 pages.

Fresko–Weiss; "Microsoft Adds Scheduling to its E–mail System"; *PC Magazine*; v11 n19; p. 56(1); Nov. 10, 1992; Dialog: File 148, Acc# 06140060.
"Introduction to Schedule+"; The Professional Development Group, Inc.; pp. 14–41; Copyright May, 1993.
Taylor, "Now Up–to–Date, Now Contact Need to Improve Integration"; *InfoWorld;* v15 n52–1; p. 81(1); Dec. 27, 1993; Dialog: File 148, Acc# 06783739.

(List continued on next page.)

*Primary Examiner*—Robert A. Weinhardt
*Attorney, Agent, or Firm*—Blakely Sokoloff Taylor & Zafman

[57] ABSTRACT

A method and apparatus for representing and storing the schedules of recurring events. The schedules are represented by recurrence rules generated according to a specific grammar. According to the grammar, each recurrence rule is composed of one or more recurrence commands. Each recurrence command corresponds to a cycle and includes a time interval indicator that specifies the duration of the cycle and a repeat quantity that determines the number of times the cycle is repeated in the schedule. Each recurrence command may also include an occurrence list that specifies at what times during a particular cycle the event occurs. The occurrence list may specify times in absolute or relative terms. Thus, the grammar supports recurrence rules for representing the schedule "first and tenth of every month" as well as the schedule "second Thursday and last Friday of every month". To represent schedules that terminate before the last event in the last cycle is completed, a symbol may be inserted into the occurrence list to distinguish the events that are performed on the last cycle from the events that are not performed on the last cycle. Complex schedules that involve cycles repeated within cycles are represented by multiple-command recurrence rules. The stored recurrence rules may be parsed to determine when events will occur. The grammar may be applied to a variety of applications, including calendar programs, video cassette recorders and home automation devices.

22 Claims, 4 Drawing Sheets

OTHER PUBLICATIONS

Printout from Schedule+ Help File from Microsoft Windows for Workgroups Version 3.11; Copyright 1985–1993; Microsoft Corporation.

Gilliand; "Keep Track of Your Time"; *Computer Shopper;* v14 n1; p. 486(2); Jan., 1994; Dialog: File 275, Acc# 01664633.

Warner; "Controlling Appointments"; *CPA Journal;* v64 n11; p. 40(4); Nov., 1994; Dialog: File 148, Acc# 07584594.

METHOD AND APPARATUS FOR REPRESENTING RECURRING EVENTS

FIELD OF THE INVENTION

The present invention relates to a method and apparatus for generating and storing data representing recurring calendar events, and more specifically, to a method and apparatus for representing in a concise, parsable grammar the timing of events that recur according to complex timing patterns.

BACKGROUND OF THE INVENTION

Numerous software programs have been developed that allow users to store schedules of events into a computer. Typically, such programs also generate visual displays that illustrate the events that will occur during a specified time period (e.g. calendars). Using such programs, users may, for example, enter information about events that are scheduled to occur during a particular month. The software stores the information on a storage device. At any time thereafter, users may instruct the software to generate a calendar of the month. When generating the calendar, the software generates indications of the scheduled events on the appropriate days of the calendar.

Calendar applications that use a client/server model have been developed. With such applications, a user interacts with a client application to enter information about events, including when the events will occur. The client application transmits data representing the events to a server application. The server application stores data representing the events. Subsequently, the client application may transmit data representing a time period, such as a particular month or year, to the server application. The server application reads the stored event data, determines which events are scheduled to occur during the specified time period, and transmits data representing the appointments that are scheduled to occur during the specified time period back to the client application. The client application then generates a calendar of the specified time period along with visual indications of the events that will occur during the specified time period.

Some events occur on a regular basis. Rather than require a user to enter information for each occurrence of a recurring event, most calendar applications allow the user to specify a first occurrence of the event and a recurrence interval for the event. For example, a user may have to attend a certain meeting every Friday at 10:00 am. Rather than enter information for each occurrence of the meeting, the user can enter information about the first occurrence of the meeting and an indication that the meeting takes place on a weekly basis (the "recurrence interval").

When generating a calendar for a particular time period, calendar applications that support recurring events must calculate if and when the event will occur during the particular time period. The calendar application makes this determination based on the initial occurrence time and the recurrence interval. Typically, a calendar application makes this determination when a user requests a calendar display of a particular period.

Current calendar applications support many typical recurrence intervals. For example, some current calendar applications allow a user to specify that an event recurs daily, weekly, monthly, or Monday through Friday. However, events that recur at less typical intervals may require multiple entries. For example, to specify an event that occurs every Monday and Wednesday, a user may have to schedule the event as if it were two weekly events. That is, the user may have to input a first event entry to indicate that the event occurs weekly every Monday, and then a second event entry to indicate that the event occurs weekly every Wednesday. Events that recur at less regular patterns may be even more difficult to specify. Consider, for example, an event that occurs on the second Tuesday and the fourth Friday of every month.

Events that recur at smaller intervals within larger intervals may be impossible to specify using current calendar applications. For example, consider an event that occurs every Monday (weekly) of every third month (monthly). Similarly, consider an event that occurs every hour (hourly) of every Wednesday (weekly).

It is clearly desirable to provide a mechanism to represent complex schedules with single event entries. It is further desirable that the schedules be represented and stored in a concise fornat to minimize the storage space required for event schedule information.

SUMMARY OF THE INVENTION

According to one aspect of the invention, a method and apparatus for representing and storing the schedules of recurring events is provided. The schedules are represented by recurrence rules generated according to a grammar. According to the grammar, each recurrence rule is composed of one or more recurrence commands. Each recurrence command corresponds to a cycle in a schedule and includes a time interval indicator that specifies the duration of the cycle and a repeat quantity that specifies the number of times the cycle is repeated in the schedule.

Each recurrence command may also include an occurrence list that specifies at what times during a particular cycle the event occurs. The occurrence list may specify times in absolute or relative terms. For example, the grammar supports recurrence rules for representing the schedule "first and tenth of every month" as well as the schedule "second Thursday and last Friday of every month".

For schedules that terminate before the last event in the last cycle is completed, a symbol is inserted into the occurrence list to distinguish the events that are performed on the last cycle from the events that are not performed on the last cycle. Complex schedules that involve cycles repeated within cycles are represented by multiple-command recurrence rules.

The stored recurrence rules may be parsed to determine when events will occur. The grammar may be applied to a variety of applications, including calendar programs, video cassette recorders and home automation devices. By storing complex schedules as concise rules, electronic devices may save storage space and reduce schedule-related communication traffic.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for representing recurring events are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
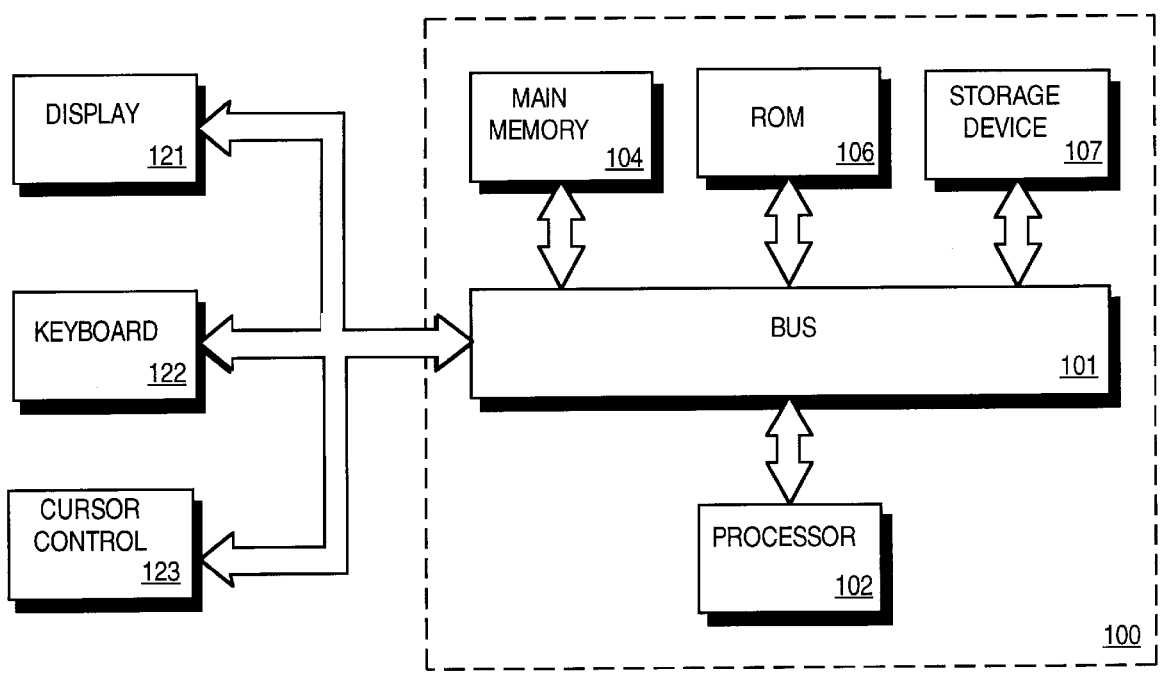
FIG. 1 is a block diagram illustrating a computer system upon which an embodiment of the invention may be implemented.

Referring to FIG. 1, a computer system 100 upon which an embodiment of the present invention can be implemented is shown. Computer system 100 comprises a bus or other communication means 101 for communicating information, and a processing means 102 coupled with bus 101 for processing information computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

Furthermore, a data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

In the currently preferred embodiment, computer system 100 is used for executing a calendar application. Processor 102 executes instructions stored in memory 104 which implement the calendar application. Execution of the instructions causes the calendar application to generate user interface controls on display 121 through which a user can enter information about recurring events, including the schedules of the recurring events.

When a user enters the schedule of a recurring event, the calendar application generates a recurrence rule that represents the schedule. In the preferred embodiment, recurrence rules are generated according to a concise, parsable grammar that will be described hereafter. The calendar application stores data representing the recurrence rules on storage device 107.

Using the grammar that will be described hereafter, even the schedules of events that recur according to complicated interval patterns can be represented with relatively concise recurrence rules. Consequently, by storing the schedules of events as recurrence rules according to the grammar, a significant amount of storage space may be saved. Further, in systems that implement client/server models of calendaring applications, the event scheduling information is often sent from the client application to the server application over a network. Therefore, by representing complex event schedules with concise rules, network traffic associated with the calendaring applications may be significantly reduced.

GRAMMAR FOR CONSTRUCTING RECURRENCE RULES

In the preferred embodiment of the invention, applications represent the schedules of recurring events in the form of recurrence rules. A recurrence rule is made up of one or more recurrence commands. Each recurrence command corresponds to a cycle within the represented schedule. Within a recurrence command, the duration of the corresponding cycle is represented by a time-interval indicator. Time-interval indicators as well as other components of recurrence commands are described in detail hereafter.

TIME-INTERVAL INDICATORS

A time-interval includes two components: a unit-type and a unit-frequency. The unit-type component expresses the granularity of the time-interval. Table 1 illustrates various unit-types supported in the preferred embodiment of the invention.

TABLE 1

| Unit-type | Symbol | Meaning |
|---|---|---|
| minuteop | M | Defines a cycle that repeats on a particular minute interval. |
| daily | D | Defines a cycle that repeats on a daily basis. |
| weekly | W | Defines a cycle that repeats on a weekly basis. |
| monthlybypos | MP | Defines a cycle that repeats on a monthly basis on a relative day and week. |
| monthlybyday | MD | Defines a cycle that repeats on a monthly basis on an absolute day. |
| yearlybymonth | YM | Defines a cycle that repeats on specific months of the year. |
| yearlybyday | YD | Defines a cycle that repeats on specific days of the year. |

To indicate a time-interval, each unit-type is combined with a unit-frequency. In the preferred embodiment, the unit-frequency is indicated by a number immediately following the unit-type symbol to which it applies. For example, an interval of two days is represented by the unit-type "D" followed by the integer "2". The meaning of the unit-frequency depends on the unit-type. Thus, the 5 in M5 is in minutes while the 3 in D3 is in days. Other examples of time-interval indicators are shown in Table 2.

TABLE 2

| Time-interval Indicators | Meaning |
|---|---|
| M5 | Repeat every five minutes |
| D1 | Repeat daily |
| D2 | Repeat every other day |
| D3 | Repeat every third day |
| W1 | Repeat weekly |
| W2 | Repeat every other week |
| W3 | Repeat every third week |

REPEAT-QUANTITY INDICATORS

In the preferred grammar, every recurrence command within a recurrence rule begins with a time-interval indicator and ends with a repeat-quantity indicator. The repeat-quantity indicator specifies the number of times a recurring cycle occurs (including the first time). In the preferred embodiment, the repeat-quantity is indicated by a repeat-quantity symbol (e.g. "#") followed by a number. For example, in the recurrence command "D2 #5", the "#5" serves as the repeat-quantity indicator. In this example, the interval indicator "D2" indicates that an event occurs on a two day cycle and the repeat-quantity indicator "#5" indicates that the cycle occurs 5 times. In the preferred embodiment of the invention, the repeat-quantity indicator #0 is used to indicate that a cycle is to be repeated indefinitely.

CYCLES WITHIN CYCLES

Each recurrence command includes one time-interval indicator. Thus, the schedules of events that repeat in a single cycle with a uniform interval are represented by recurrence rules that consist of a single recurrence command. To represent more complex event schedules, recurrence commands may be combined to form multiple-command recurrence rules.

Consider, for example, an event that occurs according to the schedule:

A) three occurrences at five minute intervals

B) Repeat (A) five times at two day intervals

C) Repeat (B) five times at six month intervals

This schedule may be represented by the multiple-command recurrence rule:

MP6 #5 D2 #5 M5 #3

This recurrence rule is made up of three recurrence commands: "MP6 #5", "D2 #5" and "M5 #3". As shall be explained below, recurrence commands of smaller granularity execute first, and then are repeated at cycles determined by the recurrence commands of larger granularity.

To begin, recurrence rules generate an initial event. The initial event counts against the repeat-quantity of the recurrence command with the smallest granularity. In the illustrated grammar, this will always be the rightmost recurrence command. Thus, after the initial event, the recurrence command "M5 #3" repeats for only two five-minute cycles. That is, five minutes after the initial event a second event will be generated. Five minutes after the second event a third event will be generated. After the generation of the third event, the recurrence comand "M5 #3" has been fully executed.

The full execution of a recurrence command counts as one execution of the next recurrence command in the rule. The next recurrence command in the rule is the recurrence command that is next with respect to the granularity of the interval that it specifies. In the present example, the recurrence command "D2 #5" is the next recurrence command, in terms of granularity, after "M5 #3". Thus, the full execution of "M5 #3"counts as one execution of the recurrence rule "D2 #5".

After the full execution of "M5 #3", the cycle specified by the recurrence command "D2 #5" will be executed. Because "M5 #3" has completely executed, the two-day cycle defined by "D2 #5" will be repeated four more times. At the end of each of the four two-day cycles, the "M5 #3" cycle is executed again.

After the full execution of "D2 #5", the recurrence command "M5 #3" will have completely executed five times, with two-day intervals between each of the five complete executions. The full execution of "D2 #5" will count as one execution of the next recurrence command, "MP6 #5". Therefore, the six month cycle specified by the recurrence command "MP6 #5" will be repeated four more times. At the end of each six month cycle, the "D2 #5" cycle is executed again.

After the full execution of "MP6 #5", the recurrence command "D2 #5" will have completely executed five times, with six month intervals between each of the five complete executions. During each of the five executions of the recurrence command "D2 #5", the recurrence command "M5 #3" will have completely executed five times, for a total of twenty-five executions. During each execution of "M5 #3", three events will be generated. Thus, the total events generated during the execution of the rule "MP6 #5 D2 #5 M5 #3" will be seventy-five (5 * 5 * 3) events.

NON-UNIFORM INTERVALS WITHIN CYCLES

As illustrated above, multiple-command rules can be used to represent the schedules of events that occur at uniform cycles, even where the cycles themselves are repeated at uniform cycles. However, some events are repeated at non-uniform intervals within uniform cycles. Consider, for example, an event that occurs every Monday, Wednesday and Thursday of every week. Such an event schedule is uniform in that it occurs according to a weekly cycle. However, within a given week, the event occurs at intervals that are not uniform.

In the present embodiment of the invention, occurrences that cannot be expressed by an interval are expressly recited by an occurrence list inserted between the interval-indicator and the repeat-quantity indicator of the appropriate recurrence command. For example, the recurrence command "W1 #0" indicates that an event repeats every week. To indicate that during every week the event takes place on Monday, Wednesday and Friday, the occurrence list "MO WE FR" is inserted into the recurrence command to produce the recurrence command "W1 MO WE FR #0".

The example given above illustrates how an occurrence list can indicate specific days within a weekly cycle. Occurrence lists may be also used to indicate specific hours or minutes within a daily cycle, specific weeks, days or hours within a monthly cycle, and specific months or days within a yearly cycle.

For example, in the schedule represented by the rule "D2 1200 1600 #5", an event occurs every other day at 1200 (noon) and 1600 (4:00 p.m.) for a total of 10 events. The repeat-quantity indicator "#5" controls the number of times the cycle is repeated. The occurrence list indicates when and how many times an event occurs during each repeated interval. In the present example, two events occur during each cycle (one at 1200 and the other at 1600) so a total of ten (2×5) events are generated.

OCCURRENCE SPECIFIERS

Occurrence lists indicate specific event occurrences through the use of absolute occurrence specifiers and/or relative occurrence specifiers. Absolute occurrence specifiers represent time in absolute terms. For example, in the rule "D2 1200 1600 #5", "1200" and "1600" respectively represent noon and 4:00 p.m. in absolute terms. Similarly, in the rule "W1 TU WE FR #5", the occurrence specifiers "TU", "WE" and "FR" represent Tuesday, Wednesday and Friday in absolute terms, respectively.

In contrast to absolute occurrence specifiers, relative occurrence specifiers indicate a particular day with reference to the relative occurrence of the day within a longer time period. For example, relative occurrence specifiers may be used to indicate the third Friday in a month, the last Monday in a month, the last day of the month, etc. A relative occurrence specifier consists of one or more offset indicators followed by a day identifier. In the preferred embodiment, offset indicators are a number followed by either a plus symbol or a minus symbol. Offset indicators followed by a plus symbol represent offsets taken from the start of the month. Offset indicators followed by a minus symbol represent offsets taken from the end of the month.

For example, the rule "MP2 1+2– FR #3 " includes two offset indicators, "1+" and "2–", followed by "FR", which represents "Friday". The offset indicator "1+" followed by "FR" represents the first Friday of the month. The offset indicator "2–" followed by "FR" indicates the second to last Friday of the month. Therefore, the rule "MP2 1+2– FR #3" defines an event which happens every other month on the first Friday and second to the last Friday of the month. It generates a total of six events.

EARLY TERMINATION

Often, events that otherwise take place according to a regular schedule terminate before the final cycle of the schedule is complete. For example, an event may occur every Monday, Wednesday and Friday for five weeks, but only occur on the Monday and Wednesday of the sixth week. The rule "W1 MO WE FR #6" cannot be used to represent the schedule of such an event, since the rule would erroneously cause an event to be generated on the Friday of the sixth week.

The grammar used in the present invention employs an end marker symbol (e.g. "$") to indicate the early termination of a cycle. In the preferred embodiment, the end marker symbol is inserted after the last occurrence specifier to be executed during the last iteration of a cycle. In the present example, the end marker symbol "$" would be placed after the occurrence specifier "WE" to indicate that the cycle terminates after the Wednesday of the last weekly cycle. The resulting rule would therefore be "W1 MO WE$ FR #6". Similarly, the rule "W1 0100$ 0200 0300 #4" generates events weekly for three weeks at 0100, 0200 and 0300. On the last (fourth week) an event is generated at 0100 only.

In addition to the end marker symbol, an enddate specifer can also be used to specify early termination of a rule. An enddate specifier simply designates a date after which no events will be generated for a rule, regardless of whether the cycles defined in the rule have been completely executed by the specified date.

Various aspects of the grammar used by the present invention to represent the schedule of recurring events have been described above. Specifically, recurrence commands are used to represent the cycles associated with recurring events. Each recurrence command includes time-interval indicator composed of a unit-type and unity-quantity to indicate the interval of a cyclical schedule. Repeat-quantities indicate how many times a cycle is repeated.

To represent a schedule that includes one repeat interval within another repeat interval, a rule may include more than one recurrence command. Occurrence lists may be used to specify multiple occurrences of an event within a cycle. Within a recurrence list, specific occurrences may be represented by absolute occurrence specifiers and/or relative occurrence specifiers. In addition, a terminating symbol may be used to indicate an early termination to a repeat pattern.

Table 4 includes the definition of an exemplary grammar that supports the above-described features. Table 4 uses standard BNF syntax. In the grammar definition contained in Table 4, terms and symbols have the meanings set forth in Table 3.

TABLE 3

| TERM/SYMBOL | MEANING |
| --- | --- |
| {} | zero or more of the enclosed elements |
| [] | zero or one of the enclosed elements |
| enddate | Controls when a repeating event terminates. The enddate is the last time an event can occur. |
| unit-frequency | Controls the number of time units in an interval |
| repeat-quantity | Controls the number of events a rule generates |
| lastday | Can be used as a replacement to daynumber to indicate the last day of the month. May be used as an occurrence specifier in MD (monthly-by-day) cycles. |
| daynumber | A number representing a day of the month. |
| month | A number representing a month of the year. |
| day | A number representing a day of the year |
| occurrence | Controls which week of the month a particular weekday event occurs. |
| weekday | A symbol representing a day of the week |
| time | The time in hours and minutes using a 24 hour clock. |
| daytime | Controls which days (and hours) of the week a weekly event occurs. |
| weekdaytime | Used in monthly events to specify which weeks, days and times an event occurs. |

TABLE 4

| | |
| --- | --- |
| start ::= | <minuteop>[<enddate>]\|<daily>[<enddate>]\| <weekly>[<enddate>]\|<monthlybypos>[<enddate>]\| <monthlybyday>[<enddate>]\|<yearlybymonth> [<enddate>]\|<yearlybyday>[<enddate>] |
| endmarker ::= | $ |
| enddate ::= | ISO 8601 (clause 5.4.1) string(e.g. 19940712T101530Z) in UTC |
| digits ::= | natural numbers |
| unit-frequency ::= | <digits> |
| repeat-quantity ::= | #<digits> |
| lastday ::= | LD |
| plus ::= | + |
| minus ::= | – |
| daynumber ::= | <1-31>[endmarker>]\|<lastday> |
| daynumberlist ::= | daynumber {<daynumber>} |
| month ::= | <1-12>[<endmarker>] |
| monthlist ::= | <month> {<monthlist>} |
| day ::= | <1-366>[<endmarker>] |
| daylist ::= | <day> {<daylist>} |
| occurence ::= | <1-5><plus>[<endmarker>]\|<1-5><minus> [<endmarker>] |
| occurencelist ::= | <occurence> {<occurencelist>} |
| weekday ::= | <SU\|MO\|TU\|WE\|TH\|FR\|SA>[<endmarker>] |
| weekdaylist ::= | <weekday> {<weekdaylist>} |
| hhmm ::= | hours and minutes, where hh specifies two digits representing hours (00 to 23) and mm specifies two digits representing minutes (00 to 59). |
| time ::= | <hhmm>[<endmarker>] |
| timelist ::= | <time> {<timelist>} |
| daytime ::= | <weekday> {<timelist>} {<daytime>} |
| weekdaytime ::= | <occurencelist> <weekdaylist> {<timelist>} {<weekdaytime>} |
| minuteop ::= | M<unit-frequency> [<repeat-quantity>] |
| daily ::= | D<unit-frequency>[<timelist>][<repeat-quantity>] [<minuteop>] |
| weekly ::= | W<unit-frequency>[<daytime>] [<repeat-quantity>]\|<minuteop>\| |
| monthlybypos ::= | MP<unit-frequency>{<weekdaytime>} [<repeat-quantity>]\|<weekly>\| <daily>\|<minuteop>] |
| monthlybyday ::= | MD<unit-frequency>~<daynumberlist>] [<repeat-quantity>]\|<weekly>\|<daily>\|<minuteop>] |
| yearlybymonth ::= | YM<unit-frequency>[<monthlist>] [<repeat-quantity>]\|<monthlybyday>\| <monthlybypos>\|<weekly>\|<daily>\| <minuteop>] |

TABLE 4-continued

```
yearlybyday ::=    YD<unit-frequency>[<daylist>][<repeat-quantity>]
                   [<monthlybyday>|<monthlybypos>|
                   <weekly>|<daily>|
                   <minuteop>]
```

To minimize the possibility of inconsistent implementations of the illustrated grammar, the preferred embodiment of the invention implements the grammar according to certain policies. The policies followed in the preferred embodiment are set forth below. However, it should be noted that these policies as well as the grammar defined in Table 4 are merely exemplary. The present invention is not limited to any specific grammar implementation.

POLICIES

In the preferred embodiment of the invention, the grammar defined in Table 4 is implemented according to the following policies:

The repeat-quantity portion of a rule defines the total number of events the rule generates, including the first event. For example, the rule "MP1 #3 W1 #3" starting on Jan. 1, 1994 would generate events on Jan. 1, 1994, January 8, January 15, Feb. 5, 1994, February 12, February 19, Mar. 5, 1994, March 12, March 19.

The repeat-quantity granularity is defined by the interval indicator immediately preceding the repeat-quantity portion of the rule. For example, "D1 #5 M15 #4" establishes a repeating event which happens for five days, four times per day.

Information, not contained in the rule, necessary to determine the next event time and date is derived from the start time of the initial occurrence of the event.

If no specific time is indicated in the recurrence rule, the time is assumed to be the time specified for the first occurrence of the appointment.

If an end date and a repeat-quantity for the first recurrence command in the rule are specified in the rule, then the recurring event ceases when the end date is reached or the number of events indicated in the repeat-quantity occur, whichever comes first.

If neither a repeat-quantity nor an end date are established for a recurrence command (e.g. "D3"), then it is assumed that the event occurs twice. That is "D3" is equivalent to "D3 #2".

If an endmark is used in a second or later recurrence command of a rule, then the endmark is applied each time that recurrence command is executed by the previous recurrence command For example, the rule "YM1 1 6 #1 MD1 7$ 14" generates events on 1/7 1/14 2/7 6/7 6/14 7/7.

Each cycle in a rule may have an associated endmark. Therefore, rules that define multiple cycles may have more than one endmark. However, any given cycle may be associated with no more than one endmark. For example, "YM1 1$ 5 7 #3 MD1 7 9$ 11 #5" is a valid rule, but "YM1 1$ 5$ 7 #3" is not.

If an endmark is used on a day of the week which is followed by several times (TU$ 1200 1300) or an endmark is used on a week occurrence that is followed by several weekdays (1+$ TU WE), then the repeating event stops after the last time or week day in the list is executed.

If a rule has an ambiguity with respect to whether it will repeat on a specific day (12th of the month) vs on a relative day (2nd Friday of the month), the specific day takes precedence. The only exception to this policy is the following policy. If the optional <weekdaytime> information is missing from a <monthlybypos> unit-type the information is derived from the initial appointment. The <occurrence> used in the recurring event is a count from the beginning of the month to the start time and the <weekday> used is the day of the week the initial appointment is scheduled to occur on. If the <monthlybypos> unit-type does not list a week day (e.g. SU) in the rule, the week day is established from the start time. For example, the rule MP1 #3 used in an appointment with a start date of 7/20/94 (which is the third Wed of the month) will repeat on 8/17/94 which is the third Wed of the month.

A repeat-quantity of #0 means repeat the cycle forever.

Only the first recurrence command of a multiple-command rule can have a repeat-quantity of 0. Consequently, the following rules are not allowed: "YM1 6 #10 MP1 1+SA #0", "D5 0600 0800 #5 M5 #0".

Using the relative occurrence specifier 5+ (e.g. 5th Friday) or 5- (e.g. 5th from last Friday) in a month that does not contain 5 weeks does not generate an event and thus does not count against the repeat-quantity. The same applies to providing a day of the month that does not occur in the month. For example, the 30th in the month of February.

The next cycle of a higher order rule does not execute until all the events of a subrule are generated. If the next event of a higher order rule comes earlier in time than the last event of a subrule, then the missed events are not generated. In other words, subrules can not interleave events with other subrules. The rule "D1 0630 0700 #4 M45 #5" results in indeterminate results because the minute subrule which begins to execute at 0630 generates events beyond 0700 which is when the daily subrule begins executing again. The rule "MP1 1+ 1- #3 W2 TU TH #5" is also incorrect.

EXEMPLARY RECURRENCE RULES

The following examples illustrate how particular schedules are represented according to the exemplary grammar based on the policies described above:

The schedule of an event which occurs hourly for 12 hours (12:00, 1:00, . . . 10:00, 11:00) may be represented by the recurrence rule "M60 #12".

The schedule of an event which occurs every 5 minutes for 1 hour (1:00, 1:05, 1:10, . . . 1:50, 1:55) may be represented by the recurrence rule "M5 #12".

The schedule of an event which occurs daily for 5 days may be represented by the recurrence rule "D1 #5".

The schedule of an event which occurs daily, for 5 days repeating at 10 minute intervals for 1 hour.(e.g. 6/1 at 12:00, 12:10, 12:20, . . . 12:50; 6/2 at 12:00, 12:10, etc.) may be represented by the recurrence rule "D1 #5 M10 #6".

The schedule of an event which occurs every other day, two times may be represented by the recurrence rule "D2".

The schedule of an event which occurs every other day at 6 a.m., 12noon and 3 p.m. for a span of three days (e.g. 6/1/94 at 6, 12 and 3 p.m. and 6/3/94 at 6, 12 and 3 p.m.) may be represented by the recurrence rule "D2 0600 1200 1500 #2".

The schedule of an event which occurs every other day at 6 a.m., 12 noon and 3 p.m. for a span of 5 days, stopping at noon on the fifth day (e.g. 6/1/94 at 6, 12, and 3,6/3/94 at 6, 12 and 3 and 6/5/94 at 6 and 12) may be represented by the recurrence rule "D2 0600 1200$ 1500 #3".

The schedule of an event which occurs weekly at 6am, repeated every 15 minutes for an hour, for five weeks (e.g. 6:00, 6:15, 6:30, 6:45 on 6/1, 6/8, 6/15, 6/22 and 6/29) may be represented by the recurrence rule "D7 0600 #5 M15 #4".

The schedule of an event which occurs weekly at 6am, repeats every 15 minutes for an hour, for four weeks stopping at 6 a.m. on the last event day (e.g. 6:00, 6:15, 6:30, 6:45 on 6/1, 6/8, 6/15 and 6:00 on 6/22) may be represented by the recurrence rule "D7 0600$ #4 M15 #4".

The schedule of an event which occurs once at 6am, repeats every 15 minutes for an hour, for 1 week stopping at 6:45 a.m. (e.g. 6:00, 6:15, 6:30, 6:45 on 6/1), may be represented by any one of the recurrence rules "D7 0600 #1 M15 #4", "D7 #1 M15 #4", and "M15 #4". Note that the latter two rules require that the start time be defined in initial occurrence information.

The schedule of an event which occurs weekly for four weeks may be represented by the recurrence rule "W1 #4".

The schedule of an event which occurs biweekly on Monday and Tuesday for 2 occurrences ending on a Monday may be represented by the recurrence rule "W2 MO$ TU #2".

The schedule of an event which occurs weekly on Tuesday and Thursday at the time specified in the first occurrence information and repeated again with a five minute interval between repetitions may be represented by the recurrence rule "W1 TU TH #3 M5 #2".

The schedule of an event which occurs weekly on Tuesday at 1200 and 1230 and Thursday at 1130 and 1200 for 10 weeks may be represented by the recurrence rule "W1 TU 1200 TH 1130 #10 M30". The recurrence rule "W1 TU 1200 1230 TH 1130 1200 #10" may represent the schedule as well.

The schedule of an event which occurs weekly on Tuesday at 1200 and 1230 and Thursday at 1130 and 1200 for 10 weeks stopping on the last Tuesday at 1230 may be represented by the recurrence rule "W1 TU$ 1200 TH 1130 #10 M30". The recurrence rule "W1 TU$ 1200 1230 TH 1130 1200 #10" represents the schedule as well.

The schedule of an event which occurs weekly on Tuesday at 1200 and 1230 and Thursday at 1130 and 1200 for 10 weeks stopping on the last Tuesday at 1200 may be represented by the recurrence rule "W1 TU 1200$ 1230 TH 1130 1200 #10".

The schedule of an event which occurs monthly for 1 year may be represented by the recurrence rule "MP1 #12".

The schedule of an event which occurs every other month on the first and last Friday of the month for 5 months may be represented by the recurrence rule "MP2 1+ 1- FR #3".

The schedule of an event which occurs every other month on the first and last Friday of the month for 5 months stopping on the first Friday in the fifth month may be represented by the recurrence rule "MP2 1+$ 1- FR #3".

The schedule of an event which occurs every six months on the first Monday of the month (repeat for 5 days) for 24 months may be represented by the recurrence rule "MP6 1+ MO #5 D1 #5".

The schedule of an event which occurs every six months on the first Monday of the month (repeat every other day at 0600, 1200 and 1500 for 20 days) for 24 months may be represented by the recurrence rule "MP6 1+ MO #5 D2 0600 1200 1500 #10".

The schedule of an event which occurs every six months on the first Monday of the month (repeat every other day at 0600, 1200 and 1500 for 20 days (repeat every 5 minutes for 3 times)) for 24 months may be represented by the recurrence rule "MP6 1+ MO #5 D2 0600 1200 1500 #10 M5 #3".

The schedule of an event which occurs every six months on the first Monday of the month and the second to last Thursday of the month (repeated five minutes later) for 24 months may be represented by the recurrence rule "MP6 1+ MO 2- TH #5 M5 #2".

The schedule of an event which occurs every six months on the first Sunday and Monday at Noon, the second Tuesday and Wednesday at 1:00 p.m. and the third Thursday and Friday at 2:00 p.m. may be represented by the recurrence rule "MP6 1+ SU MO 1200 2+ TU WE 1300 3+ TH FR 1400 #4".

The schedule of an event which occurs every month on the 7th for 12 months may be represented by the recurrence rule "MD1 7 #12".

The schedule of an event which occurs every month on the 7th, 14th, 21st, 28th for 12 months may be represented by the recurrence rule "MD1 7 14 21 28 #12".

The schedule of an event which occurs every month on the 10th and 20th for 24 months—daily for 5 days at 0600, 1200 and 1600—every 15 minutes for an hour may be represented by the recurrence rule "MD1 10 20 #24 D1 0600 1200 1600 #5 M15 #4".

The schedule of an event which occurs yearly on the 1st, 6th and 12 month on the first Monday and last Friday of the month may be represented by the recurrence rule "YM1 1 6 12 #5 MP1 1+ MO 1- FR".

The schedule of an event which occurs every other year on the 6th month (on the 12th day) for 5 years may be represented by the recurrence rule "YM2 6 #3 MD1 12".

The schedule of an event which occurs yearly on the 7th 14th 21st and 28th of the 1st 3rd and 8th month and on the 7th and 14th of the 2nd, 4th and 9th months ending on the 4th month, 14th day of the 5th year may be represented by the recurrence rule "YM1 1 3$ 8 #5 MD1 7 14$ 21 28".

The schedule of an event which occurs yearly on the 6th, 9th and 10th month on all weekends of the month may be represented by the recurrence rule "YM1 6 9 10 #10 MP1 1+ 2+ 3+ 4+ 1- SA SU #1".

The schedule of an event which occurs yearly on the 6th month for 10 years, weekly on Tuesday and Thursday at 1100 and 1300 for 4 weeks may be represented by the recurrence rule "YM1 6 #10 W1 TU TH 1100 1300 #4".

The schedule of an event which occurs yearly on the 1st, 100th, 200th and 300th day for 4 years may be represented by the recurrence rule "YD1 1 100 200 300 #4".

The schedule of an event which occurs yearly on the 1st–5th days and 100th–104th days may be represented by the recurrence rule "YD1 1 100 #5 D1 #5".

The schedule of an event which occurs yearly on the 1st–5th days and 100th–104th days stopping on 1/2/99 may be represented by the recurrence rule "YD1 1 100 D1 #5 19990102T000000Z".

Having described the features of the exemplary grammar used to represent the schedule of recurring events, a calendar application which implements the grammar shall now be described with reference to FIGS. 2 through 4.

CLIENT/SERVER CALENDARING APPLICATION

Figure 2:
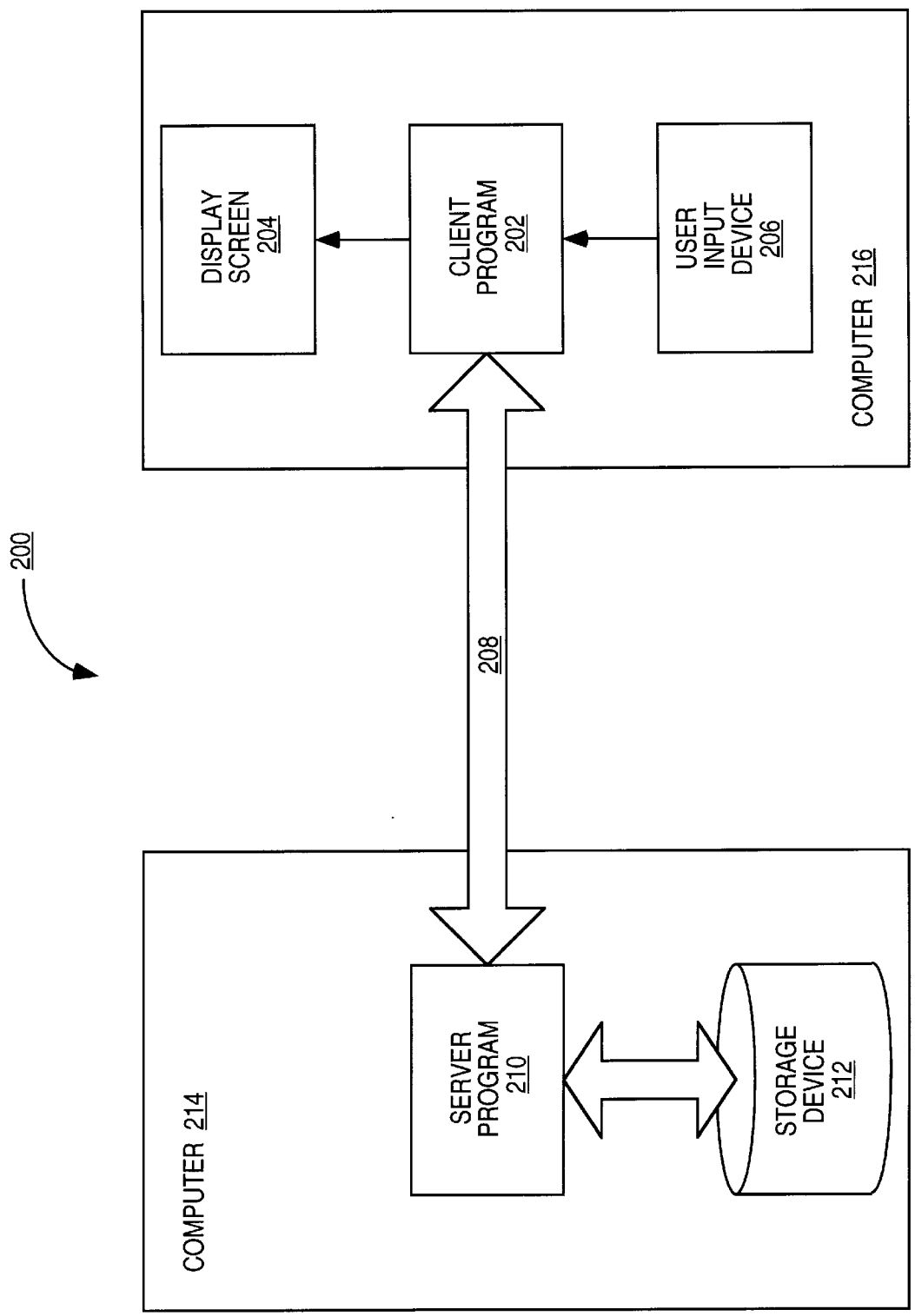
FIG. 2 is a block diagram illustrating a client/server calendar application according to one embodiment of the invention.

Referring to FIG. 2, it illustrates a computer system 200 executing a calendar application according to a server/client embodiment of the invention. Computer system 200 includes two computers 214 and 216 connected to communicate over a bus or line 208. Computers 214 and 216 may be, for example, two stations that belong to the same computer network.

The calendar application executing on computer system 200 includes a server program 210 and a client program 202. The server program 210 executes on computer 214, while the client program 202 executes on computer 216. The server program 210 and the client program 202 communicate with each other over line 208.

Computer 216 also includes a display screen 204 and a user input device 206. User input device 206 represents any device through which a user may communicate with a computer.

Client program 202 generates user interface controls on display screen 204 that allow a user to specify information about an event. The user enters the event information through operation of user input device 206. For recurring events, the information entered by the user includes an initial occurrence date and information describing at least one cycle. An exemplary user interface for receiving event information from a user is illustrated in FIG. 3.

Figure 3:
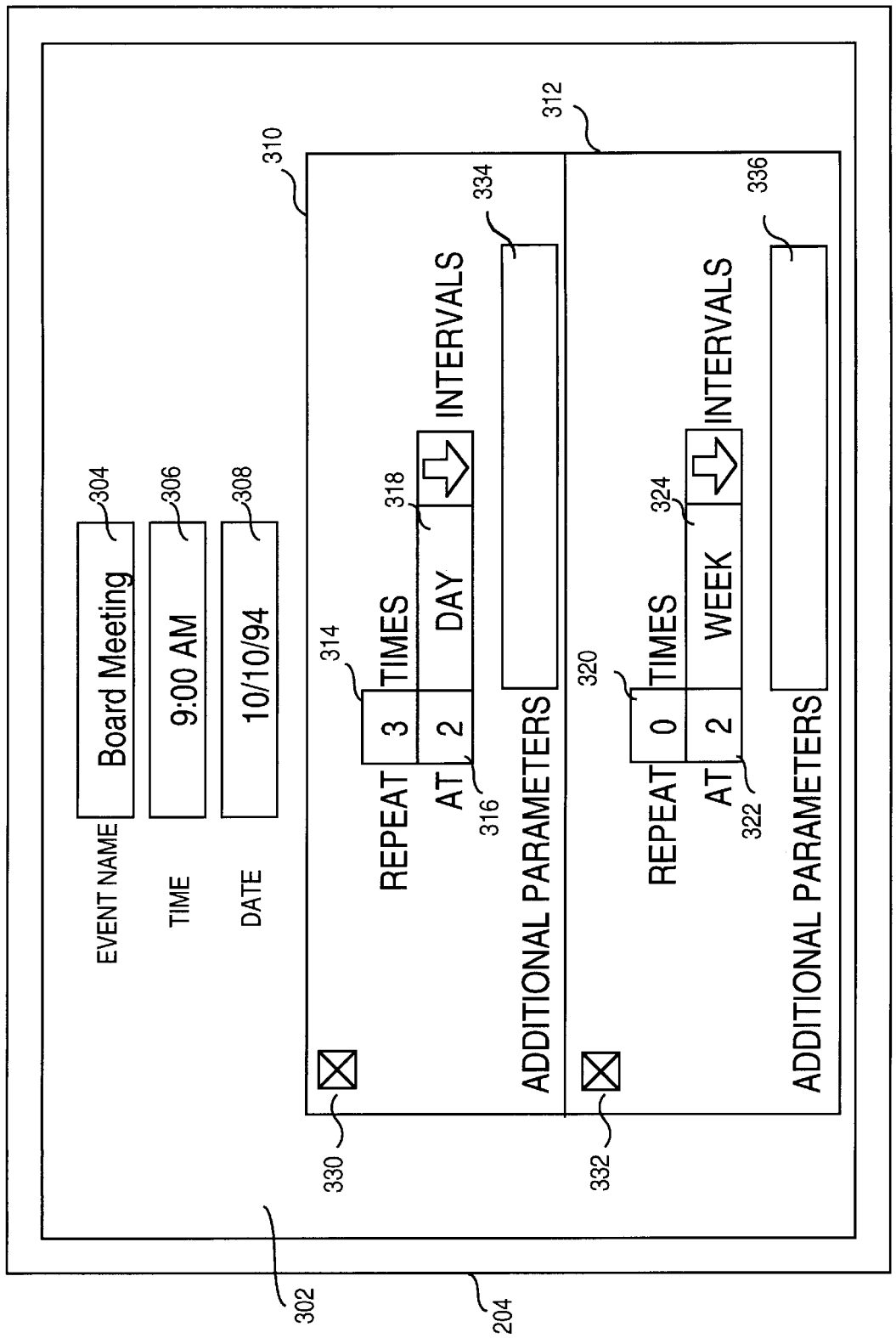
FIG. 3 illustrates an exemplary user interface for receiving information about a complex event schedule from a user.
Figure 4:
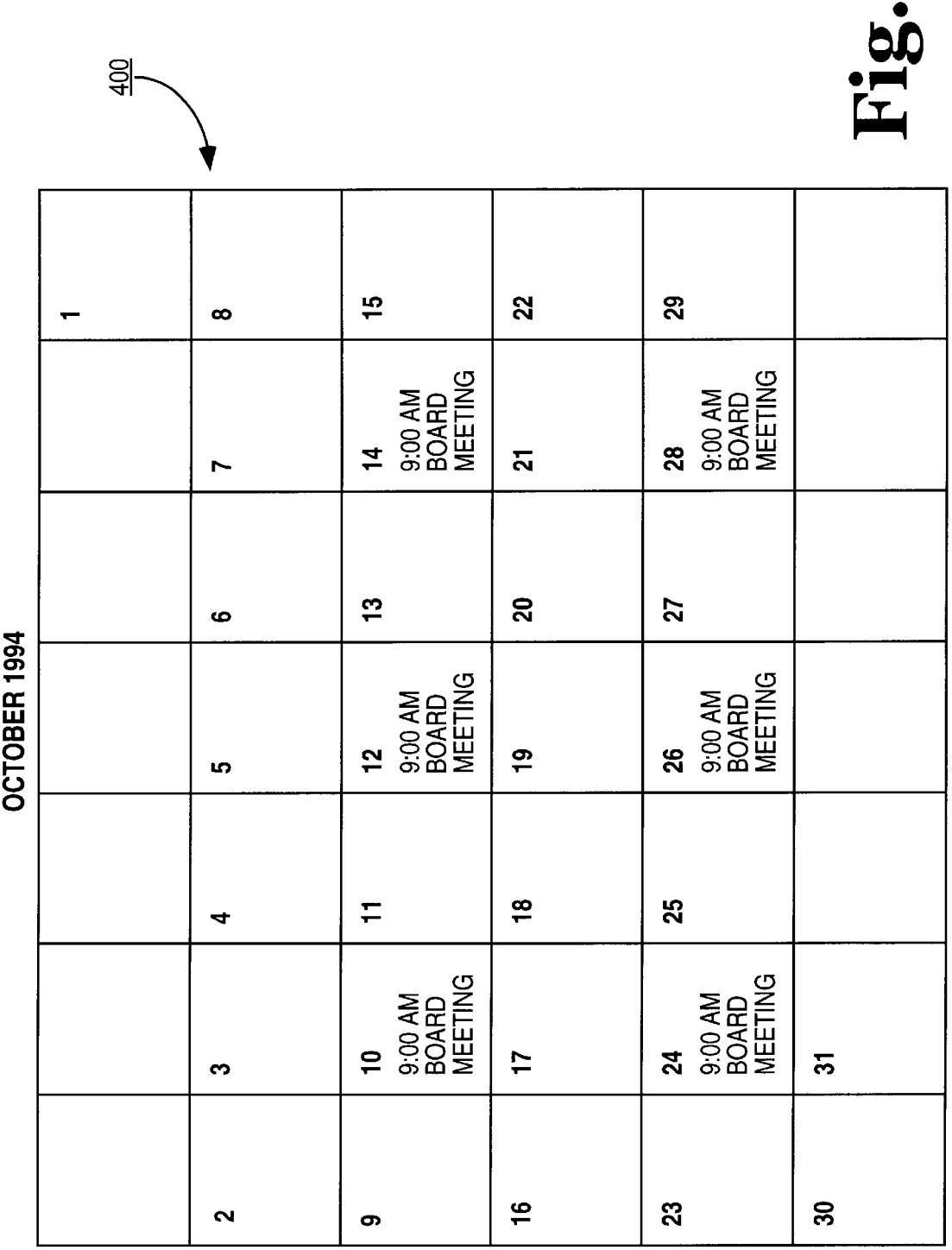
FIG. 4 illustrates a calendar generated by a calendar application based on recurrence rules according to an embodiment of the invention.

Referring to FIG. 3, it illustrates user interface controls generated on display screen 204 according to one embodiment of the invention. The user interface controls include a pop-up window or dialog box 302 that includes a plurality of text boxes 304, 306 and 308. Through text boxes 304, 306 and 308, the user enters the name, time and date of an event. For recurring events, the time and date entered in text boxes 306 and 308 will be the time and date of the first occurrence of the event. For the purposes of explanation, it shall be assumed the event at issue is a board meeting that takes place at 9:00 a.m. on Mondays, Wednesdays and Fridays every other week.

In addition to text boxes 304, 306 and 308, dialog box 302 includes a plurality of recurrence command definition mechanisms 310 and 312. Each recurrence command definition mechanism contains controls for specifying a recurring cycle. In the illustrated example, recurrence command definition mechanism 310 includes a check box 330, a repeat-quantity text box 314, a unit-frequency text box 316, a unit-type selection tool 318, and an additional parameters text box 334. Similarly, recurrence command definition mechanism 312 includes a check box 332, a repeat-quantity text box 320, a unit-frequency text box 322, a unit-type selection tool 324, and an additional parameters text box 336.

To specify the schedule of a recurring event, a user selects check box 330 to indicate that recurrence command definition mechanism 310 is being used to specify a cycle for the event named in text box 304 (the "current event"). If the schedule of the current event involves a cycle within a cycle, then the user also selects check box 332 to indicate that recurrence command definition mechanism 312 is being used to specify second cycle for the current event. In the present example, the current event occurs at daily intervals (every other day) which themselves occur at weekly intervals (every other week). Therefore, both check box 330 and check box 332 are checked.

The user specifies a first recurrence command to represent the daily cycle by interacting with the controls of recurrence command definition mechanism 310. Specifically, the user operates unit-type selection tool 318 to select a type of time unit (e.g. minute, hour, day, week, etc.) and the user enters a number into unit-frequency text box 316 to specify a unit-frequency value. The combination of the specified unit-frequency value and the specified unit-type indicates a time-interval for the first recurrence command. The user enters a number into repeat-quantity text box 314 to specify the repeat-quantity for the first recurrence command. A user may enter text into the additional parameters text box 334 to specify further details about the schedule of the event. For example, if the event will occur at 9:00 and 11:00, then the user may enter the text "900 1100" into the additional parameters text box 334.

In the present example, the board meeting occurs three times at two day intervals (Monday, Wednesday and Friday). The two day time interval is specified by setting unit-type selection tool 318 to "day", and entering the number "2" into unit-frequency text box 316. The number "3" is entered into repeat-quantity text box 314 to specify that the meeting takes place three times a week.

Responsive to the information entered in recurrence command definition mechanism 310, the client program 202 of the calendar application generates a first recurrence command. For the purposes of explanation, it shall be assumed that the calendar application implements the exemplary grammar illustrated in Table 4. Based on that grammar, the client program 202 generates the recurrence command "D2 #3".

In the present example, the Monday, Wednesday, Friday schedule of the current event is repeated every other week. Therefore, the rule that represents the schedule of the current event must indicate that the Monday, Wednesday, Friday cycle occurs within a larger cycle of two weeks. The user enters information about this larger cycle by interacting with the controls of recurrence command definition mechanism 312.

In the present example, the Monday, Wednesday, Friday cycle repeats every other week. The two week time interval is specified by setting unit-type selection tool 324 to "week", and entering the number "2" into unit-frequency text box 322. The number "0" is entered into repeat-quantity text box 320 to specify that the every-other-week cycle will repeat indefinitely.

Responsive to the information entered in recurrence command definition mechanism 312, the client program 202 of the calendar application generates a second recurrence command. Based on the exemplary grammar, the client program 202 generates the recurrence command "W2 #0".

According to the exemplary grammar, when a schedule involves a cycle within a cycle, the recurrence command that corresponds to the longer cycle precedes the recurrence command that corresponds to the shorter cycle. Therefore, the rule constructed by client program 202 in the present example would be "W2 #0 D2 #3".

Referring again to FIG. 2, once client program 202 has generated the rule data for a particular event, the client program 202 transmits the rule data along with other data about the event to server program 210 over line 208. The data transmitted along with the rule data includes data specifying the date and time of the initial occurrence of the event. The event data may also include other information, such as information about who may access the event data, if, how and when notification messages are to be sent to notify a user of the occurrence of an event, etc. Server program stores the event information, including the rule data, on a storage device 212.

Once a user has entered information about events, the user may wish to view a calendar that illustrates when the scheduled events will occur. To generate such a calendar, the user transmits to client program 202 the time range for which a calendar is desired. The client program 202 generates a calendar display on display screen 204 that covers the specified time period. In addition, the client program 202 transmits data that indicates the specified range to server program 210 over line 208.

When server program 210 receives the time range information, server program 210 reads the event information stored on storage device 212. For each event that includes a recurrence rule, the server program parses the rule to determine if and when the event associated with the recurrence rule will occur during the specified time period. Server program 210 then transmits to client program 202 data that indicates the events that will occur during the specified time period. The client program 202 receives the event data from the server program 210 and generates a visual indication of the events on the calendar.

If, for example, a user instructs client program 202 to generate a calendar of October, 1994, the client program 202 would transmit information indicating the month of October, 1994 to server program 210. Server program 210 reads the event information stored on storage device 212 to determine whether any events occur during October, 1994.

In the present example, the initial occurrence of the board meeting event takes place at 9:00 a.m. on Oct. 10th, 1994. Stored along with this initial occurrence information is the recurrence rule "W2 #0 D2 #3". By parsing this rule, the server program 210 determines that, in addition to the first occurrence, the event will also occur on October 12th, 14th, 24th, 26th and 28th. The server program 210 transmits back to client program 202 data indicating that the board meeting event will take place at 9:00 a.m. on the appropriate dates in October, 1994.

Client program 202 receives the event occurrence information from server program 210 and generates a calendar that includes indications of the events that will occur during the period covered by the calendar. Referring to FIG. 4, it illustrates an exemplary calendar 400 generated on display screen 204 by client program 202. Calendar 400 includes indications of the board meeting event on the appropriate days.

EVENT NOTIFICATION

In addition to passively responding to requests for event occurrence information, server program 210 may actively initiate operations based on the schedules stored on storage device 212. For example, server program 210 may periodically scan the stored recurrence rules to determine when events are scheduled to occur. When the server program 210 determines that an event is going to occur, the server program transmits a notification signal over line 208 to client program 202. In response to the notification signal, client program 202 generates a visual notification message on display screen 204 to notify a user that an event is going to occur. Server program 210 may be configured to generate the signal at the moment the event is scheduled to occur, or at some point in time relative to the moment the event is scheduled to occur. For example, server program 210 may generate notification notices one hour or one day before the event is scheduled to occur.

OTHER APPLICATIONS

The foregoing paragraphs describe a client/server calendaring application that generates recurrence rules, based on the grammar described herein, to represent the schedules of recurring events. The described client/server calendaring application is merely one example of an apparatus that implements the grammar of the present invention. The grammar may be implemented in numerous other types of devices. The concise nature of the recurrence rules constructed using the grammar, coupled with the power of the grammar to specify complex schedules, makes the grammar ideal for a variety of applications.

For example, the grammar may be implemented in devices that perform or invoke operations according to schedules, such as video cassette recorders. According to one embodiment of the invention, a video cassette recorder implements the grammar to store rules representing the schedules of television programs to be recorded. The video cassette recorder receives input from a user specifying a particular schedule. The video cassette recorder generates a recurrence rule to represent the schedule according to the grammar described above. The video cassette recorder parses the stored rules to determine when to initiate recording operations. When a rule indicates that a particular program is going to occur, the video cassette recorder initiates a recording operation.

In many applications, complex schedules are preferable to simple schedules. For example, burglars may notice if lights are turned on and off at the same time every day. Human occupancy is better emulated if lights are turned on and off according to more complex patterns. Therefore, according to yet another embodiment, home automation devices generate and store recurrence rules based on the grammar described herein to represent complex schedules for activating and deactivating appliances, such as lights.

Other applications of the present invention include the metering of power or water consumption. In many cases, the rates that apply to power or water consumption vary based on the time of the day and/or the day of the week in which the power or water is consumed. Higher rates apply to power or water consumed during "peak" periods. The device which calculates the applicable rates may store the relevant rate cycles according to the grammar described herein.

While specific embodiments of the present invention have been described, various modifications and substitutions will become apparent to one skilled in the art by this disclosure. Such modifications and substitutions are within the scope of the present invention, and are intended to be covered by the following claims.

What is claimed is:

1. A method for representing a schedule of a recurring event in an electronic device, wherein the schedule includes one or more cycles, wherein each of said one or more cycles has a length, the method comprising causing the electronic device to perform the steps of:

a) for each cycle in said schedule, performing the steps of
        a1) receiving a first input that specifies a unit of time used to measure the length of said cycle;
        a2) receiving a second input that specifies a number of time units;
        a3) generating a time-interval indicator representing the length of said cycle;
    wherein said step of generating said time-interval indicator includes the steps of
    generating a unit-type indicator corresponding to said unit of time;
    generating a unit-frequency indicator corresponding to said number of time units;
        a4) generating a repeat-quantity indicator representing how many times said cycle is repeated in said schedule;
        a5) generating a recurrence command to represent said cycle, said recurrence command including said time-interval indicator and said repeat-quantity indicator; and
    b) constructing a recurrence rule to represent said schedule, wherein said recurrence rule includes the recurrence command generated for each cycle of said one or more cycles.

2. The method of claim 1 further comprising the steps of:

invoking an operation at an initial occurrence time;

parsing said recurrence rule to determine subsequent occurrence times; and invoking said operation at said subsequent occurrence times.

3. The method of claim 1 wherein:

said electronic device is a computer system;

said computer system includes a display device and a storage device;

the method includes the steps of storing data representing said recurrence rule on said storage device; and generating on said display device user interface controls for receiving said first input and said second input from a user.

4. The method of claim 3 wherein:

the method further comprises the steps of executing a client application in said computer system;

executing a server application in said computer system;

said client application performs said step of generating on said display device user interface controls;

said client application performs said step of receiving said first input;

said client application performs said step of receiving said second input;

said client application performs said step of constructing said recurrence rule to represent said schedule;

said client application transmits said recurrence rule to said server application; and said server application performs said step of storing data representing said recurrence rule on said storage device.

5. The method of claim 1 wherein a given cycle of said one or more cycles includes a plurality of occurrences of said recurring event, wherein said plurality of occurrences do not occur according to a uniform interval, the method further comprising the step of:

receiving a third input indicating when said plurality of occurrences occur during said given cycle; and wherein said step of generating said recurrence command to represent said given cycle includes generating an occurrence list representing when said plurality of occurrences occur.

6. The method of claim 5 wherein said occurrence list represents when at least one of said plurality of occurrences occurs with an absolute occurrence specifier.

7. The method of claim 6 wherein said occurrence list includes data representing a weekday and data representing a relative occurrence of said weekday within a month.

8. The method of claim 5 wherein said occurrence list represents when at least one of said plurality of occurrences occurs with a relative occurrence specifier.

9. The method of claim 1 wherein said step of constructing said recurrence rule includes placing said recurrence command in an order based on the length of the cycle represented by said recurrence command for each cycle of said one or more cycles.

10. The method of claim 1 wherein the cycle is repeated N times during said schedule, wherein N represents a non-negative integer, wherein said recurring event takes place on a relative occurrence of a certain weekday in a month, the method further comprising the steps of:

generating a repeat-quantity indicator representing the value of N; and generating a relative occurrence specifier that indicates said relative occurrence of said certain weekday in said month.

11. A method for representing in an electronic device a schedule of a recurring event, wherein the schedule includes a cycle of a certain duration, wherein the cycle is repeated N times during the schedule, wherein N is at least two, wherein during the first N-1 iterations of the cycle said recurring event occurs at a first set of times and a second set of times, wherein during the Nth iteration of said cycle said recurring event occurs at said first set of times but not at said second set of times, the method comprising the steps of:

generating a time-interval indicator representing said certain duration;

generating a repeat-quantity indicator representing the value of N;

generating an occurrence list including data representing said first set of times and said second set of times;

inserting at least one symbol into said occurrence list to distinguish between said first set of times and said second set of times.

12. The method of claim 11 wherein said step of generating said occurrence list includes generating an occurrence list in which data indicating said first set of times precedes data indicating said second set of times, wherein said step of inserting one or more symbols includes inserting one or more symbols between the data indicating said first set of times and the data representing said second set of times.

13. An apparatus for storing a representation of a schedule of a recurring event, the apparatus comprising:

an input device for receiving input representing said schedule;

a processor coupled to said input device, said processor receiving said input from said input device and generating a recurrence rule based on a grammar, wherein said recurrence rule represents said schedule of said recurring event; and a storage device coupled to said processor, said processor storing data representing said recurrence rule on said storage device;

wherein said recurrence rule includes one or more recurrence commands, wherein each recurrence command of said recurrence rule represents a repeating cycle in said schedule;

wherein said grammar includes rules for constructing time-interval indicators for representing cycles that repeat every $N_1$ minutes, every $N_2$ days, every $N_3$ weeks, every $N_4$ months on a relative day and week, every $N_5$ months on an absolute day, every $N_6$ years on one or more specific months, and every $N_7$ years on one or more specific days of the year, where $N_1$–$N_7$ are each any natural number.

14. The apparatus of claim 13 wherein said grammar includes rules for constructing repeat-quantity indicators for representing how many times a cycle repeats in said schedule.

15. The apparatus of claim 14 wherein said repeat-quantity indicators comprise a repeat-quantity symbol and a number.

16. The apparatus of claim 13 wherein said grammar includes rules for constructing occurrence lists, wherein said occurrence lists indicate times that said recurring event occurs during said repeating cycle.

17. The apparatus of claim 16 wherein said grammar includes rules for constructing occurrence lists that represent specific hours in a day, specific weekdays in a week, specific days in a month, specific months in a year and specific days in a year.

18. The apparatus of claim 16 wherein said grammar includes rules for constructing occurrence lists that represent relative occurrences of weekdays in a month.

19. The apparatus of claim 13 wherein said grammar includes rules for specifying any number of occurrences of said recurring event within a repeating cycle in said schedule.

20. The apparatus of claim 13 wherein said grammar includes a first rule for specifying an absolute end time and a second rule for determining an end time by specifying a number of repetitions of each repeating cycle in said schedule.

21. A method for representing a schedule of a recurring event in an electronic device, wherein the schedule includes a plurality of cycles, wherein each of said plurality of cycles has a length, the method comprising causing the electronic device to perform the steps of:
   a) for each cycle in said schedule, performing the steps of
      a1) generating a time-interval indicator representing the length of said cycle;
      a2) generating a recurrence command to represent said cycle, said recurrence command including said time-interval indicator, and
   b) constructing a recurrence rule to represent said schedule, wherein said recurrence rule includes the recurrence command generated for each cycle of said plurality of cycles; wherein:
   said schedule includes a first cycle and a second cycle;
   said schedule includes repeating one of said first cycle and said second cycle within the other of said first cycle and said second cycle;
   said first cycle has a duration that does not vary;
   said second cycle has a duration that varies based on a selective relative occurrence;
   said step of a1) generating a time-interval indicator includes the steps of
      generating a first time-interval indicator representing the length of said first cycle; and
      generating a second time-interval indicator representing the length of said second cycle;
   wherein said step of a2) generating a recurrence command includes
      generating a first recurrence command to represent said first cycle; and
      generating a second recurrence command to represent said second cycle;
   wherein said step of b) constructing a recurrence rule includes constructing a recurrence rule that includes said first recurrence command and said second recurrence command.

22. The method of claim 21 wherein said selected relative occurrence is a relative occurrence of a weekday in a month.

* * * * *

UNITED STATES PATENT AND TRADEMARK OFFICE
CERTIFICATE OF CORRECTION

PATENT NO.    : 5,893,073
DATED         : April 6, 1999
INVENTOR(S)   : Kasso et al.

It is certified that error appears in the above-identified patent and that said Letters Patent is hereby corrected as shown below:

Title page,
Item [21], Application Number, please delete "395,458" and insert -- 08/395,458 --.

Item [56], References Cited, U.S. PATENT DOCUMENTS,
In Gupta et al., please insert the following "Class and Sub-Class" -- 364/402 --.
In Williams et al., please insert the following "Class and Sub-Class" -- 364/401R --.
In the first reference, please delete "Paul Linder" and insert -- Paul Lindner --.
In the second reference, please delete "Gilliand" and insert -- Gilliland --.

Primary Examiner, please delete "Robert A. Weinhardt" and insert
-- Stephen R. Tkacs --.

Signed and Sealed this

Sixteenth Day of April, 2002

*Attest:*

JAMES E. ROGAN
*Attesting Officer*     Director of the United States Patent and Trademark Office